United States Patent
Takenoiri et al.

(10) Patent No.: US 8,329,321 B2
(45) Date of Patent: Dec. 11, 2012

(54) PERPENDICULAR MAGNETIC RECORDING MEDIUM

(75) Inventors: Shunji Takenoiri, Nagano (JP); Yasushi Sakai, Nagano (JP)

(73) Assignee: Fuji Electric Co., Ltd. (JP)

( * ) Notice: Subject to any disclaimer, the term of this patent is extended or adjusted under 35 U.S.C. 154(b) by 2065 days.

(21) Appl. No.: 11/174,281

(22) Filed: Jul. 1, 2005

(65) Prior Publication Data
US 2006/0177703 A1 Aug. 10, 2006

(30) Foreign Application Priority Data
Jul. 5, 2004 (JP) ................................ 2004-197775

(51) Int. Cl.
*G11B 5/66* (2006.01)

(52) U.S. Cl. .......................... 428/828; 428/829; 428/830

(58) Field of Classification Search ........................ None
See application file for complete search history.

(56) References Cited

U.S. PATENT DOCUMENTS

| | | | |
|---|---|---|---|
| 5,851,643 A * | 12/1998 | Honda et al. | 428/212 |
| 6,183,893 B1 * | 2/2001 | Futamoto et al. | 428/831.2 |
| 6,468,670 B1 * | 10/2002 | Ikeda et al. | 428/611 |
| 6,830,824 B2 * | 12/2004 | Kikitsu et al. | 428/828.1 |
| 6,881,497 B2 * | 4/2005 | Coffey et al. | 428/828.1 |
| 6,939,626 B2 * | 9/2005 | Tang | 428/811.2 |
| 7,081,309 B2 * | 7/2006 | Do et al. | 428/828.1 |
| 2003/0096127 A1 | 5/2003 | Hikosaka et al. | |
| 2005/0053803 A1 * | 3/2005 | Umeda et al. | 428/694 T |

FOREIGN PATENT DOCUMENTS

| | | |
|---|---|---|
| JP | 2003-157516 A | 5/2003 |
| JP | 2003-346315 A | 12/2003 |
| JP | 2004-39033 A | 2/2004 |

OTHER PUBLICATIONS

Notification of Reasons for Refusal issued in corresponding Japanese application No. 2005-183707, dated Aug. 10, 2007.
Girt, Erol et al., "Anitferromagnetically Coupled Perpendicular Recording Media," IEEE Transactions on Magnetics, vol. 39, No. 5, Sep. 2003, pp. 2306-2310.

* cited by examiner

*Primary Examiner* — Kevin Bernatz
(74) *Attorney, Agent, or Firm* — Rossi, Kimms & McDowell LLP (57) ABSTRACT

A perpendicular magnetic recording medium is disclosed that achieves improved recordability without deteriorating thermal stability by reducing the switching field. A perpendicular magnetic recording medium of the invention has a first magnetic recording layer and a second magnetic recording layer between with is interposed a coupling layer that ferromagnetically couples the two layers. The first and second magnetic recording layers satisfy an inequality $Ku_1T_1 > Ku_2T_2$ in the case where $Hk_1 > Hk_2$ and an inequality $Ku_1T_1 < Ku_2T_2$ in the case where $Hk_1 < Hk_2$, where $Hk_1$ and $Hk_2$ are anisotropy magnetic fields, $Ku_1$ and $Ku_2$ are uniaxial anisotropy constants, and $T_1$ and $T_2$ are thicknesses of the first magnetic recording layer and the second recording layer, respectively. An exchange coupling energy between the magnetic recording layers is preferably at least $5 \times 10^{-3}$ erg/cm$^2$. Advantageously, the coupling layer is mainly composed of a material selected from V, Cr, Fe, Co, Ni, Cu, Nb, Mo, Ru, Rh, Ta, W, Re, and Ir, and has a thickness of at most 2 nm. At least one of the magnetic recording layers preferably has a granular structure.

19 Claims, 6 Drawing Sheets

PERPENDICULAR MAGNETIC RECORDING MEDIUM

CROSS REFERENCE TO RELATED APPLICATIONS

This application is based on, and claims priority to, Japanese Application No. 2004-197775, filed on Jul. 5, 2004, the contents of which are incorporated herein by reference.

BACKGROUND OF THE INVENTION

A. Field of the Invention

The present invention relates to a perpendicular magnetic recording medium mounted on various magnetic recording devices, in particular to a perpendicular magnetic recording medium mounted on a hard disk drive used for an external storage device of computers, AV equipment, and other apparatus.

B. Description of the Related Art

The recording density of hard disk drives (HDDs) is rapidly increasing and this trend is likely to continue in the future. As a result of this remarkable enhancement of the recording density, "thermal fluctuation" has become a problem. The thermal fluctuation phenomenon causes failure of stable retention of recorded signals. In the longitudinal magnetic recording system commonly employed now, the higher recording density causes more significant thermal fluctuation. To cope with this problem, a perpendicular magnetic recording system is being actively developed in which the stability of a bit increases with increase of the recording density, which is contrary to the situation with an longitudinal magnetic recording system.

To advance the enhancement of recording density in a magnetic recording medium, the magnetic isolation between the crystal grains composing a magnetic recording layer must be promoted and the magnetization reversal unit needs to be reduced. The thermal stability (resistance to thermal fluctuation) of a magnetic material is represented by an index KuVa, a product of a uniaxial anisotropy constant Ku and an activation volume Va, the latter being known to correlate to the volume of a magnetization reversal unit V. That is, the thermal stability of a magnetic recording medium deteriorates as the KuVa (or KuV) decreases. As is apparent from the index, thermal stability deteriorates with the decrease of the magnetization reversal unit that is required to enhance the recording density. Therefore, a perpendicular magnetic recording medium still raises a problem of thermal fluctuation. So, the Ku must be increased to keep thermal stability even when the magnetization reversal unit is decreased.

Meanwhile, the magnetic field intensity required for recording in an HDD is known to be approximately proportional to the Ku. As a result, the increase of the Ku to keep thermal stability elevates the magnetic field intensity required for recording. If the increase of the magnetic field intensity is significant, recording may become impossible.

With a decrease in the magnetization reversal unit, the demagnetizing field decreases, and the switching field of a magnetic recording layer increases. Consequently, the magnetic field intensity required for recording increases when the magnetization reversal unit is decreased.

The miniaturization of the magnetization reversal unit and the increase of Ku, both directed to high recording density, contribute to improve the recording resolution and the thermal stability of a magnetic recording medium. However, both of these tend to lower the easiness with which a magnetic recording medium is recorded, referred to as "recordability."

Thus, a method is demanded that improves the thermal stability and the read-write performance of a magnetic recording medium without lowering the recordability. To solve this problem, a method has been proposed in which the magnetic layer is divided into two or more layers, and the layers are deposited with varied compositions or a nonmagnetic layer(s) is inserted between the divided magnetic layers. (See for example, Japanese Unexamined Patent Application Publication No. 2003-157516.) This document discloses that by interrupting the epitaxial growth to divide a magnetic recording layer, media noise of the magnetic recording medium can be reduced while preserving a volume of magnetization reversal in it to improve thermal stability. However, the distance between the recording head and the soft magnetic backing layer increases in a thick magnetic recording layer, and the switching field increases when the magnetization reversal unit is decreased directing to high density recording. Therefore, the recordability inevitably deteriorates in the magnetic recording medium in this method.

Japanese Unexamined Patent Application Publication No. H2004-39033 proposes a method in which the reverse magnetic domain noise is reduced and the resistance to thermal fluctuation is improved by applying antiferromagnetic coupling (AFC) employed in longitudinal magnetic recording media to a perpendicular magnetic recording medium. It has been disclosed, however, that the use of antiferromagnetically coupled magnetic recording layers causes an increase of the switching field. (See for example, Erol Girt et al., IEEE Trans. on Magn. (United States of America), Vol. 39, No. 5, p. 2306-2310 (2004).) Thus, degradation of the recordability is essentially inevitable.

The decrease of a magnetization reversal unit improves noise and S/N (signal to noise ratio) of a magnetic recording medium. The decrease of a magnetization reversal unit, however, degrades thermal stability as described above, and also increases the switching field of the magnetic recording medium due to a decrease of the demagnetizing magnetic field. The increase of the Ku and a thickness of the magnetic recording layer for preserving thermal stability also tend to increase the switching field of a magnetic recording medium. Although the reduction of the magnetization reversal unit is essential to achieve high recording density of a magnetic recording medium, on the one hand, this is in a trade-off relationship with the recordability of the magnetic recording medium. This circumstance has been an obstacle to advancing high density recording of a magnetic recording medium.

The present invention is directed to overcoming or at least reducing the effects of one or more of the problems set forth above.

SUMMARY OF THE INVENTION

In view of the above problems, it is an object of the present invention to provide a perpendicular magnetic recording medium that achieves improvement in recordability of recording without impairing thermal stability. Another object is to provide a perpendicular magnetic recording medium that simultaneously achieves improvements in high density recording and recordability, with improvements in performance of the noise characteristic, the S/N characteristic, and other characteristics.

To attain these and other objects, the inventors of the present invention made intensive studies and solved the above problems by providing appropriate ferromagnetic coupling between magnetic recording layers, to accomplish the invention.

More specifically, a perpendicular magnetic recording medium comprises a nonmagnetic substrate, a first magnetic recording layer, a coupling layer disposed directly on the first magnetic layer, and a second magnetic recording layer disposed directly on the coupling layer. The first magnetic recording layer and the second magnetic recording layer are ferromagnetically coupled through the coupling layer. An axis of easy magnetization of the first magnetic recording layer and an axis of easy magnetization of the second magnetic recording layer are approximately perpendicular to a plane of the nonmagnetic substrate. An anisotropy magnetic field $Hk_1$, a uniaxial anisotropy constant $Ku_1$, and a thickness $T_1$ of the first magnetic recording layer, and an anisotropy magnetic field $Hk_2$, a uniaxial anisotropy constant $Ku_2$, and a thickness $T_2$ of the second magnetic recording layer satisfy the following relations. If $Hk_1 > Hk_2$, then $Ku_1 T_1 > Ku_2 T_2$, and if $Hk_1 < Hk_2$, then $Ku_1 T_1 < Ku_2 T_2$. These features reduce the switching field without impairing thermal stability, and enhance the recordability.

Advantageously, an exchange coupling energy per unit area between the first magnetic recording layer and the second magnetic recording layer is at least $5 \times 10^{-3}$ erg/cm$^2$.

Preferably the coupling layer is composed of an element selected from a group consisting of V, Cr, Fe, Co, Ni, Cu, Nb, Mo, Ru, Rh, Ta, W, Re, and Ir, or an alloy principally composed of at least one element selected from the group. The coupling layer preferably has a thickness of at most 2 nm, more preferably, not more than 0.3 nm. These features appropriately control the exchange coupling energy between the first magnetic recording layer and the second magnetic recording layer.

In a preferred embodiment at least one of the first magnetic recording layer and the second magnetic recording layer has a granular structure that is composed of a matrix of a nonmagnetic oxide or a nonmagnetic nitride and magnetic crystal grains dispersed in the matrix.

Of the first magnetic recording layer and the second magnetic recording layer, it is desirable that the magnetic recording layer that exhibits lower Hk contains cobalt and chromium, and a content of platinum is in a range of zero to 10 at %. The magnetic recording layer that exhibits lower Hk advantageously further contains at least one element selected from Ta, B, Nb, and N.

A perpendicular magnetic recording medium having the above-described structure and providing appropriate ferromagnetic coupling between the magnetic recording layers exhibits a reduced switching field of a magnetic recording medium without impairing thermal stability and, at the same time, achieves improvement in performances of the noise characteristic, S/N characteristic, and other characteristics. Therefore, a perpendicular magnetic recording medium simultaneously attains improvement in thermal stability, improvement in recordability, and improvement in recording density.

Some preferred embodiments according to the invention will be described in detail in the following with reference to accompanying drawings.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

First, a principle of the invention will be described. Studies have been disclosed on an longitudinal magnetic recording medium and on a perpendicular magnetic recording medium concerning antiferromagnetically coupled multilayer magnetic recording layers intending the compatibility between the thermal stability and the improvement in performance of such as noise reduction or S/N enhancement of the magnetic recording medium. There has been insufficient study, however, of ferromagnetically coupled multilayer magnetic recording layer with controlled coupling energy between the magnetic recording layers. Therefore, the inventors have made the detailed theoretical and experimental studies, and obtained the relationships shown in FIG. 2 and FIG. 3.

Figure 2:
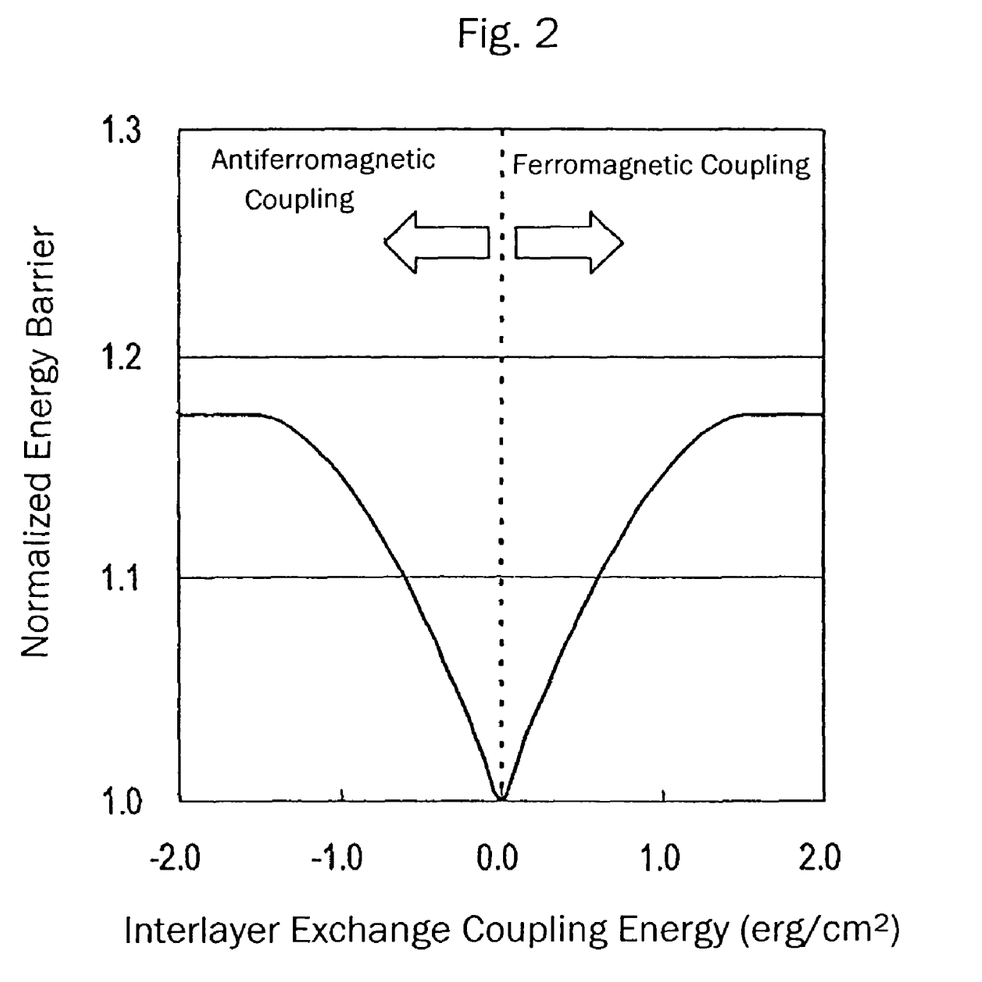
FIG. 2 shows the dependence of the normalized energy barrier on the interlayer exchange coupling energy.

FIG. 2 shows an example of a study of the dependence of the normalized energy barrier on the exchange coupling energy between magnetic recording layers in two magnetic recording layers. The energy barrier is an index to thermal stability, with larger values indicating greater thermal stability. The energy barrier in FIG. 2 represents the value normalized by a value at which the exchange coupling energy between the two magnetic recording layers is zero. The left-hand side of the dotted line in FIG. 2 represents the state of the antiferromagnetic coupling between the two magnetic recording layers, while the right hand side represents the state of the ferromagnetic coupling. In either coupling, the larger absolute value of the exchange coupling energy between the layers means the stronger coupling. As is apparent from FIG. 2, thermal stability increases with an increase of the absolute value of the coupling energy, that is, with increase of coupling strength, in both antiferromagnetic coupling and ferromagnetic coupling of two magnetic recording layers.

Figure 3:
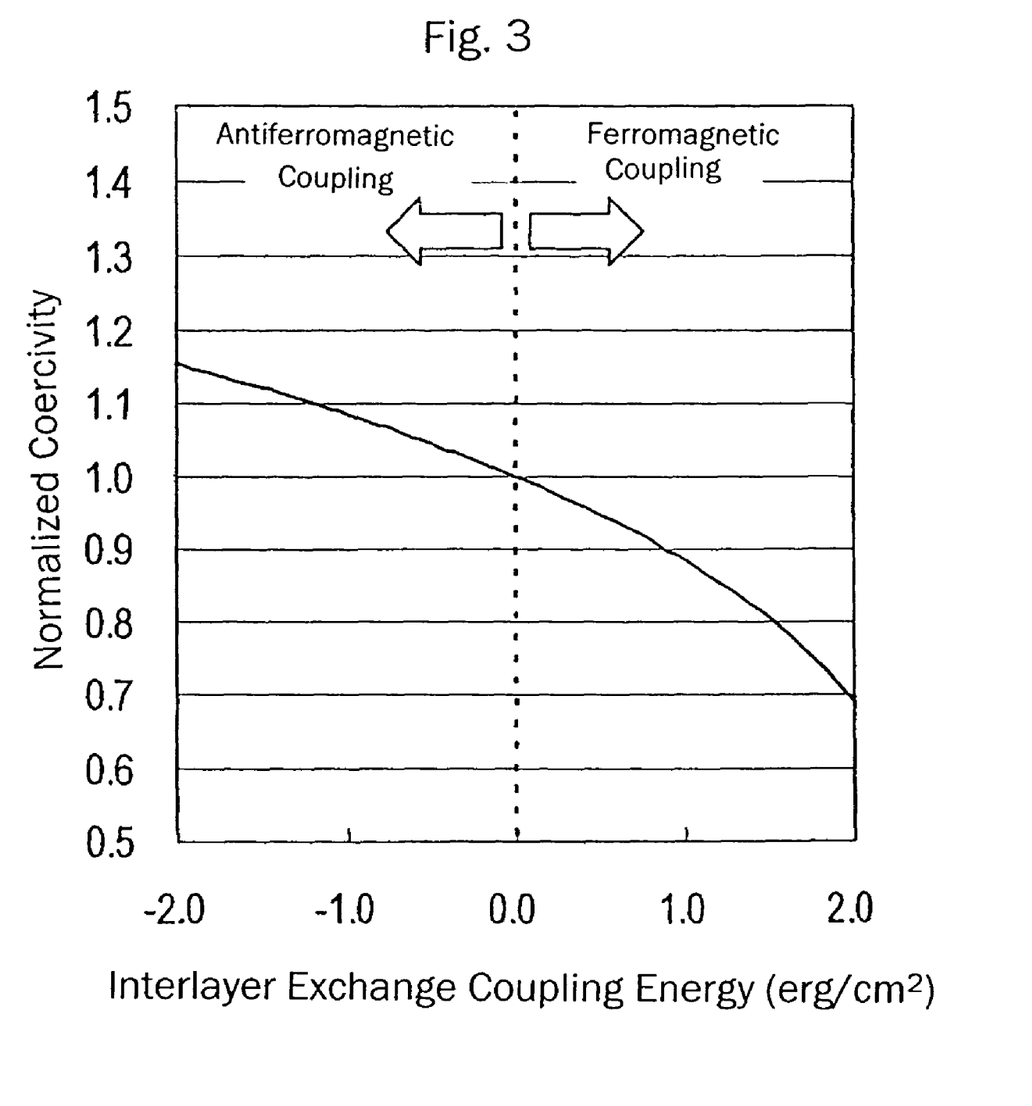
FIG. 3 shows the dependence of the normalized coercivity on the interlayer exchange coupling energy.

FIG. 3 shows the results of studies relating to the dependence of the coercivity (Hc) on the exchange coupling energy between magnetic recording layers. FIG. 3 represents the coercivity in the normalized coercivity that is normalized by the value at which the exchange coupling energy between the magnetic recording layers is zero. The larger coercivity means a larger magnetic field required for recording on a magnetic recording medium, that is, there is a degradation of recordability on the magnetic recording medium. The left-hand side of the dotted line of FIG. 3 represents, as in FIG. 2, the state of antiferromagnetic coupling between the two magnetic recording layers, while the right hand side represents the state of ferromagnetic coupling. As is apparent from FIG. 3, the normalized coercivity increases with an increase of the absolute value of the coupling energy in the antiferromagnetic coupling, while in the ferromagnetic coupling, in contrast, the normalized coercivity decreases with increase of the absolute value of the coupling energy.

Considering the results shown in FIG. 2 and FIG. 3 for antiferromagnetic coupling between two magnetic recording layers, it is clear that an increase of the absolute value of the exchange coupling energy enhances thermal stability, but deteriorates the recordability due to increase of the coercivity. As to the ferromagnetic coupling, in contrast, increase of the exchange coupling energy enhances thermal stability, and at the same time, improves the recordability. It has been thus clarified that the employment of two ferromagnetically coupled magnetic recording layers achieves simultaneous improvements in thermal stability and recordability.

Figure 4:
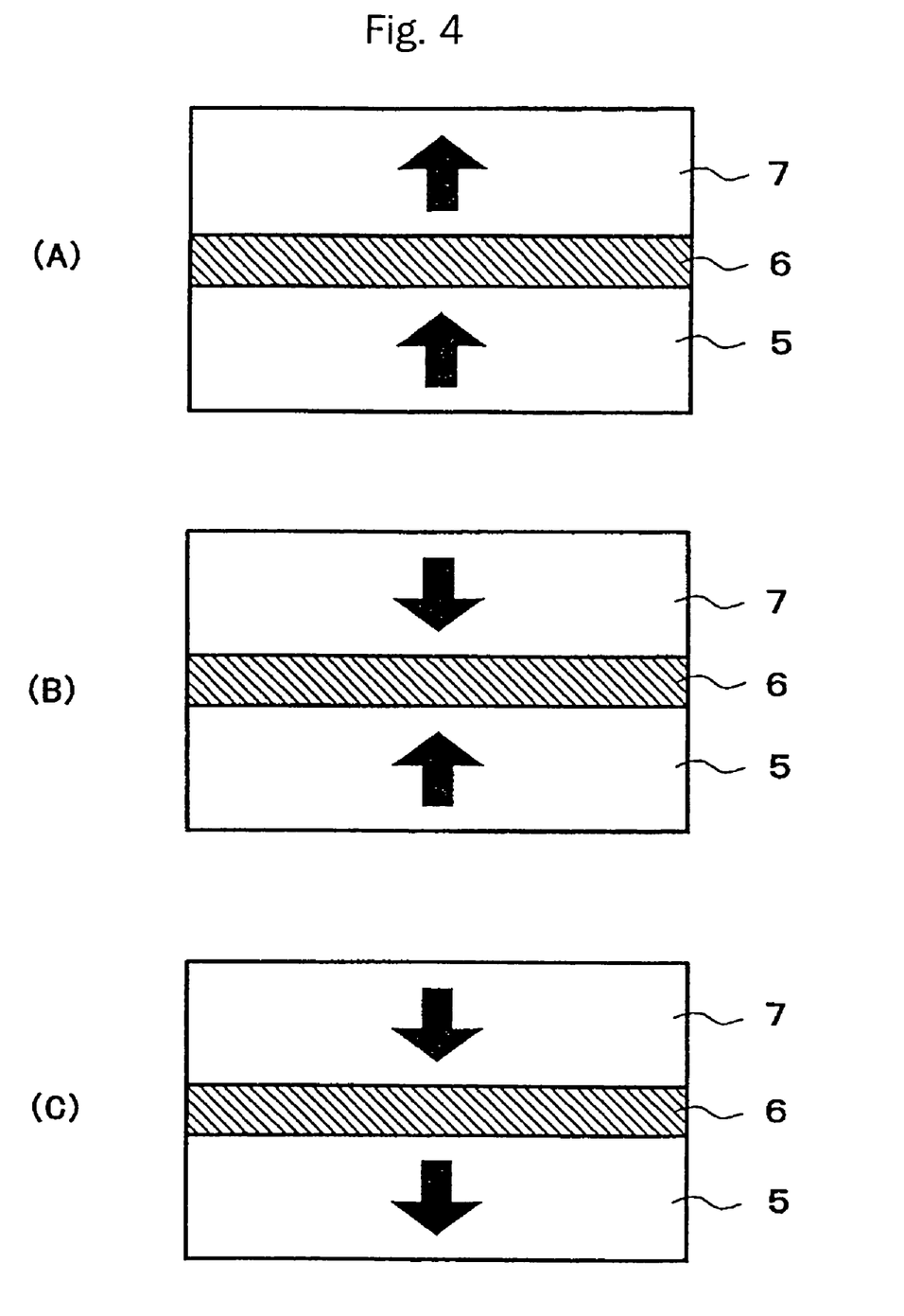
FIG. 4 shows a conceptual illustration of the magnetization reversal in a perpendicular magnetic recording medium according to the invention.
Figure 5:
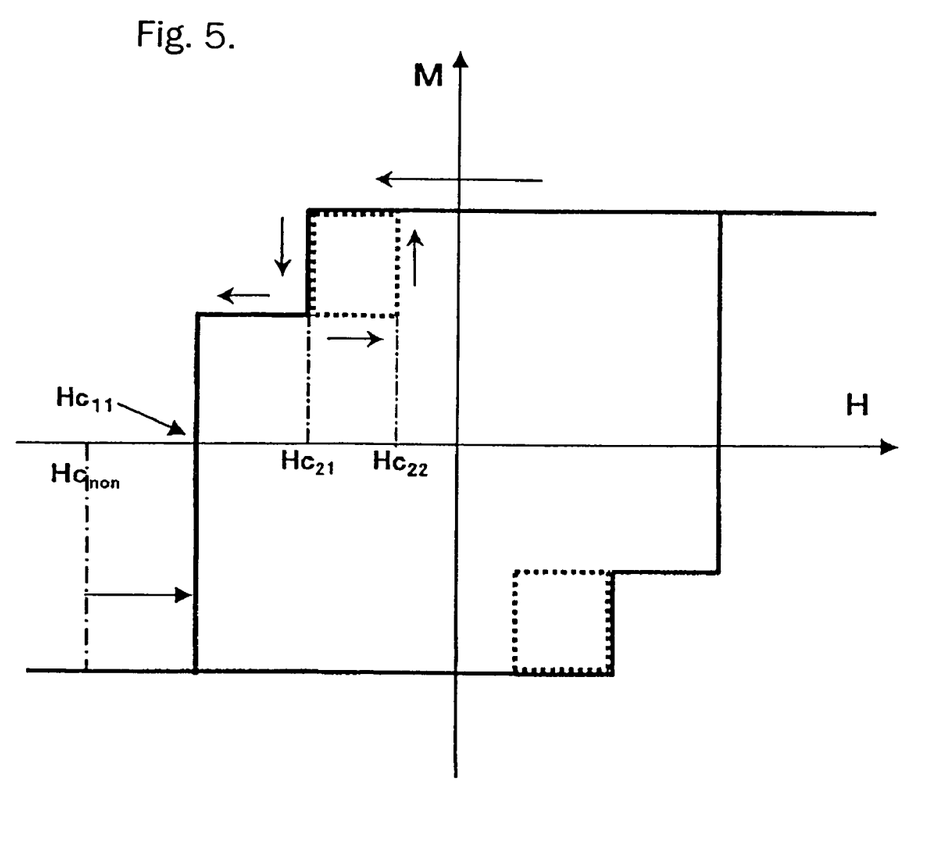
FIG. 5 shows a conceptual illustration of the hysteresis loop in a perpendicular magnetic recording medium according to the invention.

This effect is enhanced by providing a condition in which each magnetic layer reverses magnetization individually. FIGS. 4 and 5 relate to the individual magnetization reversal of the magnetic recording layers. FIG. 4 shows an example in which first magnetic recording layer 5 and second magnetic recording layer 7 ferromagnetically couple through coupling layer 6, and the magnetization reversal first arises in the second magnetic recording layer. The arrows indicate the direction of magnetization in each magnetic recording layer. FIG. 5 is a schematic diagram of a hysteresis loop (M-H loop) of the magnetic recording medium, in which the abscissa represents the external magnetic field (H) applied on the magnetic recording medium and the ordinate represents the magnetization (M) of the magnetic recording medium.

In FIG. 5, the magnetic recording medium is saturated with a sufficiently large magnetic field in +H direction (the right direction in FIG. 5). At this moment, the magnetization of each magnetic recording layer is in the state as (A) in FIG. 4. Applying a magnetic field in the −H direction (the left direction in FIG. 5), magnetic reversal in the second magnetic recording layer occurs at $Hc_{21}$. At this moment, the magnetization of each magnetic recording layer is in the state as (B) in FIG. 4. Because the magnetic recording layers are ferromagnetically coupled, the $Hc_{21}$ lies in the negative H side (the left side half of FIG. 5). Increasing the magnetic field in the −H direction, magnetization reversal also arises in the first magnetic recording layer at $Hc_{11}$. At this moment, the magnetization of each magnetic recording layer is in the state as (C) in FIG. 4.

At the moment of the magnetization reversal in the first magnetic recording layer, the second magnetic recording layer has already reversed the magnetization thereof. So, the magnetization reversal in the first magnetic recording layer is easy owing to the effect of the magnetic field of the second magnetic recording layer. Moreover, the magnetization reversal is much easier than the condition without ferromagnetic coupling between the first and second magnetic recording layers. Representing the switching field in the condition without ferromagnetic coupling by $Hc_{non}$, the inequality $Hc_{non} > Hc_{11}$ holds as shown in FIG. 5, where the comparison is made between the absolute values.

On the other hand, because the ferromagnetic coupling exists between the magnetic recording layers, as shown in FIG. 2, the energy barrier is high and thermal stability is kept high. By reversing the magnetization of each magnetic recording layer individually and sequentially, the switching field can be more effectively lowered without impairing thermal stability.

Furthermore, the inventors have made detailed experimental studies on the conditions of magnetic recording layers, the exchange coupling energy, and the material, thickness, and other conditions of the coupling layer for controlling the exchange coupling energy between the magnetic recording layers. More details of the invention are described below.

Figure 1:
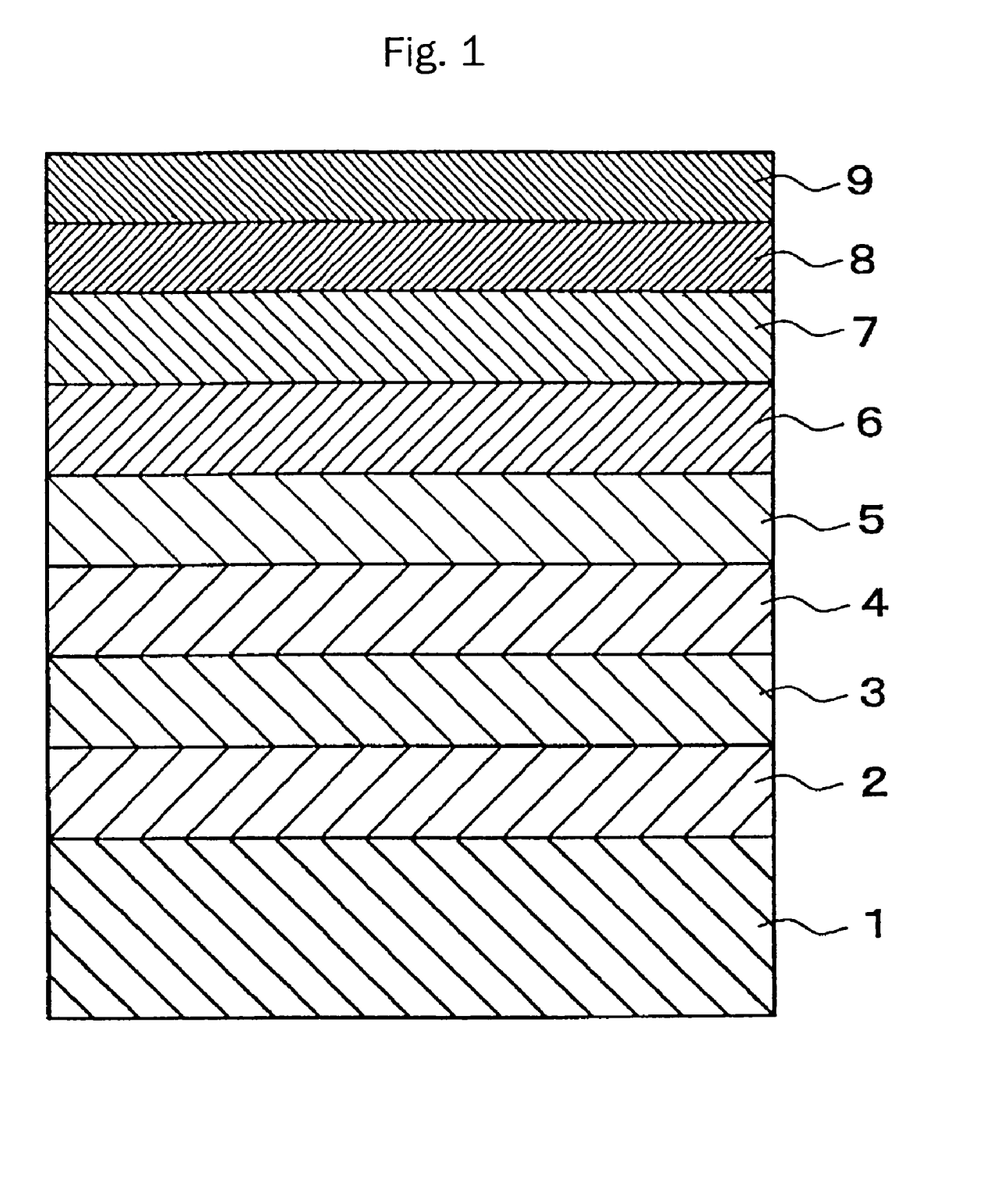
FIG. 1 is a schematic sectional view illustrating an example of a structure of a perpendicular magnetic recording medium according to the invention.

FIG. 1 is a schematic sectional view illustrating an aspect of an embodiment of a perpendicular magnetic recording medium according to the invention. On nonmagnetic substrate 1 sequentially formed are soft magnetic backing layer 2, underlayer 3, nonmagnetic intermediate layer 4, first magnetic recording layer 5, coupling layer 6, second magnetic recording layer 7, protective layer 8, and liquid lubricant layer 9.

Nonmagnetic substrate 1 can be a substrate used in common magnetic recording media, and can be composed of an aluminum alloy with NiP plating, strengthened glass, crystalline glass, or the like. When the substrate heating temperature is confined up to 100° C., a plastic substrate made of a resin such as polycarbonate or polyolefin can also be used.

Soft magnetic backing layer 2 is preferably formed to improve read/write characteristics by controlling the magnetic flux from the magnetic head used for magnetic recording. The soft magnetic backing layer may be omitted. The soft magnetic backing layer can be composed of a crystalline alloy such as FeTaC or Sendust alloy (FeSiAl), or an amorphous cobalt alloy such as CoZrNb or CoTaZr. The optimum thickness of soft magnetic backing layer 2 varies depending on the structure and characteristic of the magnetic head used for recording. When the soft magnetic backing layer is formed in successive deposition with other layers, the thickness is preferably in a range of 10 nm to 500 nm in the balance with productivity. When the soft magnetic backing layer is deposited on the nonmagnetic substrate by a plating method, for example, before deposition of other layers, the thickness can be as thick as several microns (μm).

Underlayer 3 is preferably formed to control the crystalline orientation and the grain size of the layer formed on the underlayer: nonmagnetic intermediate layer 4 or first magnetic recording layer 5. The underlayer can be composed of a nonmagnetic material or a soft magnetic material. The underlayer may be omitted.

A soft magnetic material is more favorably used since the underlayer functions as a part of a soft magnetic backing layer. The soft magnetic material can be selected from Permalloy materials including NiFeAl, NiFeSi, NiFeNb, NiFeB, NiFeNbB, NiFeMo, and NiFeCr. The thickness of an underlayer of Permalloy is adjusted so that the magnetic property and the read-write performance of the magnetic recording layer are optimum, and is preferably in a range of 3 nm to 50 nm to balance between the characteristics and the productivity of the magnetic recording medium.

A nonmagnetic material for the underlayer can be selected from Ta, Zr, Ni3Al, and the like. When a nonmagnetic material is used for the underlayer, a thin film is better from the viewpoint of effective concentration of the magnetic field generated by the recording head to the soft magnetic backing layer, and the thickness is preferably in a range of 0.2 nm to 10 nm.

Nonmagnetic intermediate layer 4 is formed to appropriately control the crystal alignment, the grain size, and the grain boundary segregation in first magnetic recording layer 5. Nonmagnetic intermediate layer 4 may be omitted. A material for the nonmagnetic intermediate layer can be selected from ruthenium and a ruthenium-based alloy with one or more additives selected from the group consisting of C, Cu, W, Mo, Cr, Ir, Pt, Re, Rh, Ta, and V. A material for the nonmagnetic intermediate layer also can be selected from Pt, Ir, Re, and Rh. A thickness of the nonmagnetic intermediate layer necessarily is as thin as possible to achieve high density recording, as far as magnetic properties and read-write performance of the magnetic recording layer do not degrade. The thickness is preferably in the range of 1 nm to 20 nm.

First magnetic recording layer 5 is preferably composed of a ferromagnetic alloy containing at least cobalt and platinum.

The axis of easy magnetization (for example, c-axis of hexagonal close packed structure) of the first magnetic recording layer needs to align in the direction perpendicular to the film surface for the use in a perpendicular magnetic recording medium. First magnetic recording layer 5 can be composed of an alloy material such as CoPt, CoCrPt, CoCrPtB, or CoCrPtTa, a multilayered film of (Co/Pt)n or (Co/Pd)n, or a granular material of CoPt—$SiO_2$, CoCrPtO, CoCrPt—$SiO_2$, CoCrPt—$Al_2O_3$, CoPt—AlN, or CoCrPt—$Si_3N_4$. A granular structure is composed of a matrix of a nonmagnetic oxide or a nonmagnetic nitride and magnetic crystal grains dispersed in the matrix. The granular structure suppresses the magnetic interaction between neighboring magnetic crystal grains in the magnetic recording layer. When the ferromagnetic coupling is provided between the first magnetic recording layer and the second magnetic recording layer, the coupling is held between the magnetic recording layers, and the intergranular magnetic interaction is suppressed within the magnetic recording layer. As a result, improvement in noise and S/N characteristics can be achieved. Therefore, the granular structure is particularly favorable in the first magnetic recording layer. The thickness of the first magnetic recording layer is preferably at most 30 nm, more preferably at most 15 nm, from the viewpoint of productivity and high density recording, though it is not limited to any specific range.

Coupling layer 6 is necessary for appropriate ferromagnetic coupling between the first magnetic recording layer 5 and the second magnetic recording layer 7. If the two magnetic recording layers are laminated without a coupling layer, the two layers reverse each magnetization at the same time, failing to provide the function that the thermal stability is improved and simultaneously the switching field is reduced by individually reversing the magnetization. If the exchange coupling between the laminated magnetic recording layers completely disappears, the energy barrier lowers, as is apparent from the null point of the exchange coupling energy in FIG. 2, thus the thermal stability is not improved. Therefore, the provision of a coupling layer is necessary from the viewpoint of leading to an appropriate coupling energy between the magnetic recording layers while retaining the ferromagnetic coupling. The ferromagnetic coupling between magnetic recording layers must be effective at room temperature at which a perpendicular magnetic recording medium operates.

The exchange coupling energy between magnetic recording layers can be calculated as follows. In FIG. 5, the dotted lines represent a minor loop. After saturating the magnetic recording medium by applying a sufficiently large magnetic field in +H direction, the magnetic field is applied gradually in −H direction. A magnetization reversal in the magnetic recording layer occurs at $Hc_{21}$. During the process of the applied magnetic field going back from the midway between $Hc_{21}$ and $Hc_{11}$, the magnetic recording layer reverses the magnetization again at $Hc_{22}$. The exchange coupling energy J can be calculated in terms of $Hc_{11}$ and $Hc_{22}$ by using equations (1) and (2). Equations (1) and (2) are valid in the case a magnetization reversal arises first in the second magnetic recording layer.

Equation 1 (1)
$$J = 2Ku_1 T_1 \frac{(Hc_{11} + Hc_{22}) + (Hk_1^{\mathit{eff}} - Hk_2^{\mathit{eff}})}{Hk_1 - \frac{Hk_2}{k}}$$

Equation 2 (2)
$$k = \frac{Ku_2 T_2}{Ku_1 T_1}$$

Here, $Ku_2$, $T_2$, $HK_2$, and $Hk_2^{\mathit{eff}}$ represent uniaxial anisotropy constant, thickness, anisotropy magnetic field, and anisotropy magnetic field taking demagnetization into account, respectively, of the second magnetic recording layer in which magnetization reversal first occurs at $Hc_{21}$. The $Ku_1$, $T_1$, $Hk_1$, and $Hk_1^{\mathit{eff}}$ represent the same quantities of the first magnetic recording layer that reverses magnetization later at $Hc_{11}$. A relation Hk=2 Ku/Ms holds, where Ms represents saturation magnetization. If an order of magnetization reversal is changed between the first and second magnetic recording layers, the subscripts 1 and 2 to the Ku, T, Hk, and $Hk^{\mathit{eff}}$ are interchanged.

In an actual perpendicular magnetic recording medium, the hysteresis curve has some slope due to an effect of demagnetization, and accurate calculation of the demagnetizing factor is difficult. Consequently, the obtained J value is a rough estimation. Nevertheless, according to the study by the inventors, a J value not smaller than $5 \times 10^{-3}$ erg/cm$^2$ has been found appropriate to obtain the advantages of improvement in thermal stability and reduction of switching field owing to the lamination.

A material for coupling layer 6 is selected from the group consisting of V, Cr, Fe, Co, Ni, Cu, Nb, Mo, Ru, Rh, Ta, W, Re, and Ir, or an alloy principally composed of at least one element selected from the group. A nonmagnetic material such as V, Cr, or Cu can provide ferromagnetic coupling and an appropriate coupling energy between magnetic recording layers by adjusting the film thickness. A ferromagnetic material such as Fe, Co, or Ni can provide an appropriate coupling energy by alloying with a nonmagnetic material or adjusting the deposition conditions or the deposition atmosphere. Palladium and platinum can also provide ferromagnetic coupling. The palladium and platinum, however, have been found inadequate because the anisotropy energy increases at the interface between the coupling layer and the magnetic recording layer, and rather increases the switching field.

The thickness of coupling layer 6 is preferably at most 2 nm to attain an exchange coupling energy per unit area between the first magnetic recording layer and the second magnetic recording layer of at least $5 \times 10^{-3}$ erg/cm$^2$ and to retain favorable crystal alignment of the second magnetic recording layer. According to the study by the inventors, materials for coupling layer 6 other than Fe, Co, and Ni provide appropriate ferromagnetic coupling condition if the thickness of coupling layer 6 is 0.3 nm or smaller, or in the range of 1.2 nm to 2 nm. A thickness of more than 2 nm results in coupling energy that is too small, and the effect of thermal stability improvement cannot be obtained. In the case of the ferromagnetic material of Fe, Co, and Ni, if the thickness exceeds 2 nm, the magnetic property of Fe, Co, or Ni exhibits too intensely, causing deterioration of the performance of the magnetic recording medium. Consequently, a thickness of coupling layer 6 is preferably at most 2 nm.

A thickness of coupling layer 6 is more preferably 0.3 nm or smaller. For the materials of coupling layer 6 other than Fe, Co, and Ni, a thickness of 0.3 nm or smaller allows the coupling energy to be controlled in a wide range and to secure better magnetic isolation between the crystal grains composing the magnetic recording layer resulting in reduced noises.

For Fe, Co, and Ni, a thickness of 0.3 nm or smaller suppresses the influence of the magnetic property of Fe, Co, and Ni to a negligible level.

This is because a coupling layer composed of a ferromagnetic material of Fe, Co, or Ni having a thickness more than 2 nm exhibits the magnetic property of Fe, Co, or Ni intensely and causes to deteriorate the performance of the magnetic recording medium. On the other hand, a coupling layer composed of a nonmagnetic material having a thickness more than 2 nm exhibits too small coupling energy and thus, the effect of thermal stability improvement cannot be obtained.

For second magnetic recording layer 7, the same material and structure as in first magnetic recording layer 5 can be employed.

The first magnetic recording layer and the second magnetic recording layer are made to hold the following relation. The uniaxial anisotropy constant $Ku_1$, thickness $T_1$, anisotropy magnetic field $Hk_1$ of the first magnetic recording layer and the uniaxial anisotropy constant $Ku_2$, thickness $T_2$, anisotropy magnetic field $Hk_2$ of the second magnetic recording layer satisfy the inequality $Ku_1T_1 > Ku_2T_2$ in a case $Hk_1 > Hk_2$. In a case $Hk_1 < Hk_2$, the thicknesses and materials of the first and the second magnetic recording layers are determined so as to satisfy the inequality $Ku_1T_1 < Ku_2T_2$. This is because the switching field can be effectively decreased without impairing thermal stability by reversing the magnetization first in the second magnetic recording layer in the case $Hk_1 > Hk_2$, for example. The magnetization reversal first in the second magnetic recording layer, in turn, occurs when the inequality $Ku_1T_1 > Ku_2T_2$ holds. Thus, the relative magnitude between $Hk_1$, $Hk_2$, $Ku_1T_1$, and $Ku_2T_2$ are specified. According to these relations, the effect of improvement in thermal stability and the effect of reduction of switching field are simultaneously obtained.

The following describes determination of a composition of the magnetic recording layer that exhibits lower anisotropy magnetic field Hk between the first magnetic recording layer and the second magnetic recording layer. To reduce media noise and improve S/N, it is appropriate to decrease platinum content of a magnetic recording layer. The decrease of the platinum content, however, deteriorates thermal stability. Consequently, to secure thermal stability in a conventional magnetic recording layer, the platinum content has been determined to be a high value exceeding 10 at %. Because a laminated magnetic recording layer controlling interlayer coupling energy according to the present invention secures satisfactory thermal stability, the platinum content can be reduced. Specifically, the platinum content can be reduced in the magnetic recording layer that exhibits lowest Hk value, which is the magnetic recording layer that starts to reverse magnetization first among the magnetic recording layers. It is yet possible for this magnetic recording layer not to contain platinum at all. The study by the inventors further revealed that the content of platinum, if contained, is preferably 10 at % or less to effectively reduce the switching field as well as to reduce media noise and improve S/N. Namely, a composition of the magnetic recording layer is preferably determined such that a magnetic recording layer exhibiting lower Hk between the first magnetic field and the second magnetic recording layer contains at least cobalt and chromium, and content of platinum, if contained, is at most 10 at %.

The magnetic recording layer more preferably contains at least one element selected from Ta, B, Nb, and N. This composition promotes reduction of noise of the medium and more effectively decreases the switching field of the magnetic recording layer.

More specifically, favorable compositions of the magnetic recording layer exhibiting lower Hk between the first magnetic recording layer and the second magnetic recording layer can be, for example, 78 at % Co-22 at % Cr, 76 at % Co-18 at % Cr-6 at % B, 66 at % Co-20 at % Cr-10 at % Pt-4 at % B, 75 at % Co-18 at % Cr-5 at % Pt-2 at % Ta.

The magnetic recording layers can be constructed with three or more layers. The ferromagnetic coupling is provided between every two magnetic recording layers through a coupling layer. The order of magnitude of the product KuT of a uniaxial anisotropy constant and a thickness of each magnetic recording layer are determined in accordance with the order of magnitude of the anisotropy magnetic field Hk of the magnetic recording layer. By individually reversing the magnetization of each magnetic recording layer as in this measure, the structure having three or more magnetic recording layers still produces the effect of improving thermal stability and the effect of reducing switching field at the same time.

Protective layer 8 can be composed of a thin film of mainly carbon, for example. Other various thin film materials that are commonly used in a protective layer of magnetic recording media can also be used.

Liquid lubricant layer 9 can be composed of perfluoropolyether lubricant, for example. Other various lubricant materials that are commonly used for liquid lubricant layer in magnetic recording media can also be used.

The layers laminated on a nonmagnetic substrate can be formed by various deposition techniques that are commonly employed in the field of magnetic recording media. The layers except for a liquid lubricant layer can be formed by a DC magnetron sputtering method, an RF magnetron sputtering method, or a vacuum evaporation method. A liquid lubricant layer can be formed by a dipping method or a spin-coating method.

The present invention will be described further in detail referring to specific examples of perpendicular magnetic recording media. Needless to say, the invention shall not be limited to the examples, and various modifications are possible within the spirit and scope of the invention.

EXAMPLE 1

An example is described on a perpendicular magnetic recording medium manufactured with a structure shown in FIG. 1. Nonmagnetic substrate 1 used was a chemically strengthened glass substrate having a smooth surface (N-5 glass substrate manufactured by HOYA Corporation). After cleaning, the substrate was introduced into a sputtering apparatus and amorphous soft magnetic backing layer 2 of CoZrNb having a thickness of 200 nm was deposited using a target of 87 at % Co-5 at % Zr-8 at % Nb. Then, underlayer 3 of NiFeSi having a thickness of 11 nm was deposited using a target of a Permalloy, 82 at % Ni-12 at % Fe-6 at % Si. Subsequently, nonmagnetic intermediate layer 4 of ruthenium having a thickness of 10 nm was deposited using a target of ruthenium under an argon gas pressure of 4.0 Pa. Subsequently, first magnetic recording layer 5 of CoCrPt—$SiO_2$ having a granular structure and a thickness of 10 nm was deposited using a target of 90 mol % (74 at % Co-12 at % Cr-14 at % Pt)—10 mol % $SiO_2$ under a gas pressure of 5.3 Pa. Then, coupling layer 6 of ruthenium having a thickness of 0.2 nm was deposited using a target of ruthenium. Subsequently, second magnetic recording layer 7 of CoCrPt—$SiO_2$ having a granular structure and a thickness of 6 nm was deposited using a target of 90 mol % (72 at % Co-16 at % Cr-12 at % Pt)-10 mol % $SiO_2$ under a gas pressure of 5.3 Pa. Finally, protective layer 8 of carbon having a thickness of 7 nm was deposited using a carbon target, and the substrate having the laminated layers was taken out from the vacuum chamber. The deposition of the layers except for the nonmagnetic intermediate layer of ruthenium and the first and second magnetic recording layers of CoCrPt—SiO$_2$ was conducted under an argon gas pressure of 0.67 Pa. The first and second magnetic recording layers of CoCrPt—SiO$_2$ were formed by an RF magnetron sputtering method; other layers were formed by a DC magnetron sputtering method. After that, liquid lubricant layer 9 of perfluoropolyether having a thickness of 2 nm was formed by a dipping method. Thus, a perpendicular magnetic recording medium was manufactured.

COMPARATIVE EXAMPLE 1

A perpendicular magnetic recording medium of Comparative Example 1 was manufactured in the same manner as in Example 1 except that neither coupling layer 6 of ruthenium nor second magnetic recording layer 7 of CoCrPt—SiO$_2$ was deposited.

The Ku$_1$, Ku$_2$ and other properties of Example 1 were measured in the following way. The samples of magnetic recording media having a structure without a soft magnetic backing layer of CoZrNb were fabricated. The samples were a magnetic recording media having only a first magnetic recording layer on an intermediate layer of ruthenium and a magnetic recording media having only a second magnetic recording layer on an intermediate layer of ruthenium. Uniaxial anisotropy constants were measured by a magnetic torque meter resulting in the values of Ku$_1$ and Ku$_2$ of $4.2\times 10^{-6}$ erg/cm$^3$ and $2.5\times 10^{-6}$ erg/cm$^3$, respectively. Consequently, the Ku$_1$T$_1$ and Ku$_2$T$_2$ were $4.2\times 10^{-12}$ erg/cm$^2$ and $1.5\times 10^{-12}$ erg/cm$^2$, respectively. Anisotropy magnetic fields Hk$_1$ and Hk$_2$ were 18.7 kOe and 13.2 kOe, respectively. Therefore, Hk$_1$>Hk$_2$ and Ku$_1$T$_1$>Ku$_2$T$_2$ held in Example 1.

On the samples of Examples 1 and Comparative Example 1 obtained as described above, measurements of the coercivity (Hc) were made using a Kerr effect measuring instrument, and measurements of overwrite (O/W), output signal, normalized noise, ratio of readback output signal to noise (S/N), D$_{50}$, and decay rate of output signal were made using a read/write tester. Here, the D$_{50}$ represents a linear recording density at which the output becomes half the maximum value. Comparisons were made between Example 1 and Comparative Example 1.

Figure 6:
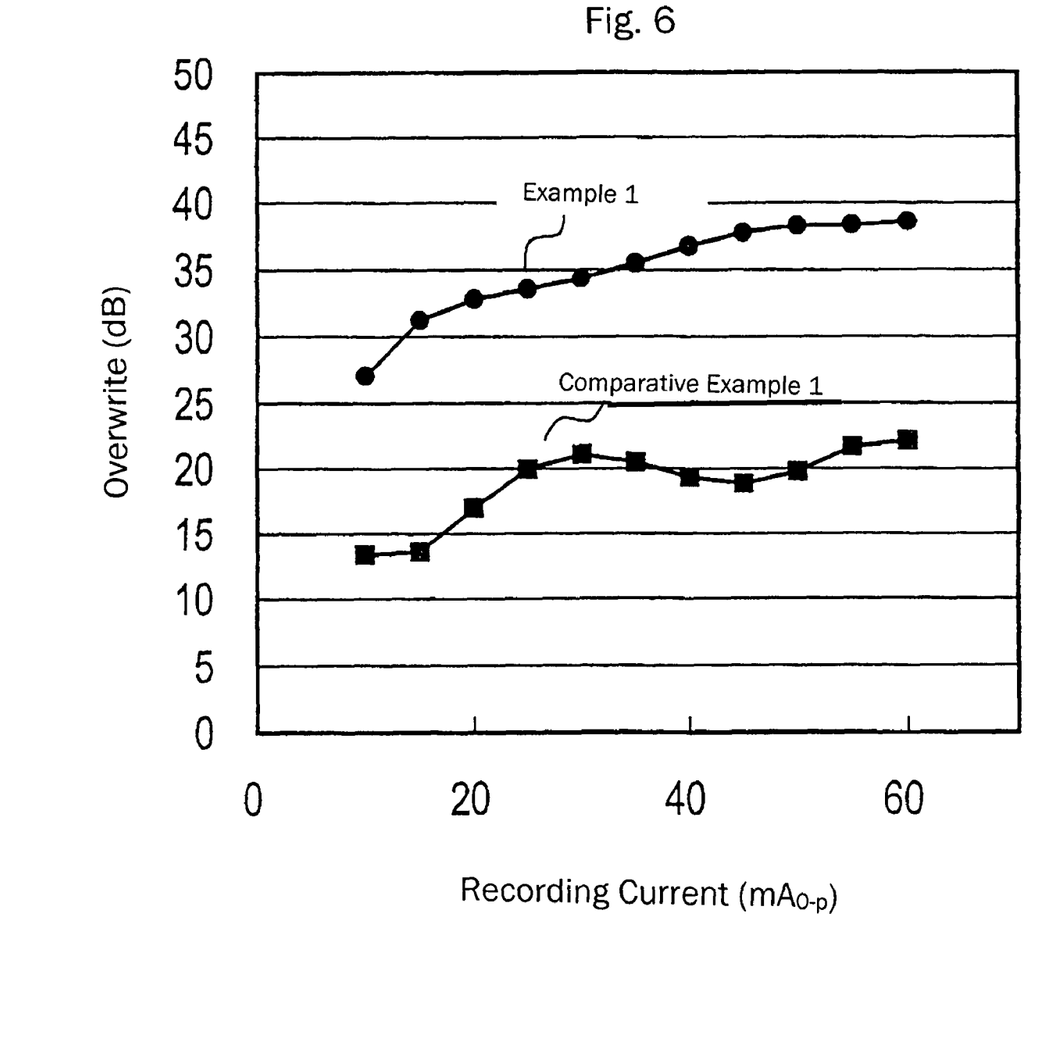
FIG. 6 shows the dependence of the overwrite performance on the recording current in perpendicular magnetic recording media of Example 1 and Comparative Example 1.

FIG. 6 shows the O/W of the magnetic recording media of Example 1 and Comparative Example 1 in the dependence on the recording current when the signals at 45 kfci (killo flux change per inch) were overwritten on the signals recorded at 336 kfci. Table 1 shows Hc, track-averaged output signal (TAA) at 336 kfci, normalized noises, S/N, D$_{50}$, and decay rate of output signal at 28 kfci.

FIG. 6 shows that the O/W in Comparative Example 1 is lower than that in Example 1 and increases only up to about 20 dB with increase of the recording current. On the contrary, Example 1 achieves the condition O/W>30 dB, which is generally considered necessary, at low recording current, and attains an O/W of larger than 35 dB at 50 mA, which is the nominal current of the head used in the present measurement. This result demonstrates that the recordability is excellent in the magnetic recording medium of Example 1.

As shown in Table 1, the Hc in Example 1 was reduced by 2,000 Oe (about 30%) as compared with Comparative Example 1. Example 1 exhibited an exchange coupling energy between magnetic layers of 0.16 erg/cm$^2$ and satisfies the condition Hk$_1$>Hk$_2$ and Ku$_1$T$_1$>Ku$_2$T$_2$. This condition contributes to the reduction of Hc, which in turn is believed to improve the recordability.

Generally, a reduction of Hc tends to degrade read-write performance. Contrary to this, Example 1 achieved the enhancement of output and the reduction of noises, improving the S/N by 2 dB as compared with Comparative Example 1. The D$_{50}$ represents the recording resolution; the larger D$_{50}$ indicates the possibility of recording to higher density. The D$_{50}$ increased by about 8% in Example 1 as compared with Comparative Example 1, demonstrating enhancement of the recording density of a magnetic recording medium. As for the decay rate of output signals, the smaller value indicates the higher thermal stability. As is apparent in Table 1, the difference in the decay rate of signal output between Example 1 and Comparative Example 1 is within measurement error, and it can be stated that the decay rate of output signals is nearly zero in both Example 1 and Comparative Example 1.

As described above, the structure having two magnetic layers that are ferromagnetically coupled according to the invention has been shown to improve the recordability of a magnetic recording medium without impairing thermal stability. In addition, the improvement in performances of a magnetic recording medium including noise reduction and S/N enhancement has been proven, and the enhancement of recording density in a magnetic recording medium has been achieved.

TABLE 1

| Item | Example 1 | Comp Ex 1 |
|---|---|---|
| Hc (Oe) | 4,710 | 6,770 |
| TAA [336 kfci] (mVp-p) | 1.82 | 1.29 |
| normalized noises [336 kfci] (μVrms/mVp-p) | 19.5 | 22.4 |
| S/N [336 kfci] (dB) | 25.5 | 23.5 |
| D$_{50}$ (kfci) | 371 | 344 |
| decay rate of output signals [28 kfci] (%/decade) | 0.67 | 0.25 |

COMPARATIVE EXAMPLE 2

A perpendicular magnetic recording medium of Comparative Example 2 was manufactured in the same manner as in Example 1 except that the thickness of the first magnetic recording layer of CoCrPt—SiO$_2$ was 7 nm and the thickness of the second magnetic recording layer was 12 nm. The exchange coupling energy, uniaxial anisotropy constants Ku$_1$ and Ku$_2$, anisotropy fields Hk$_1$ and Kk$_2$ of the first magnetic recording layer and the second magnetic recording layer were equivalent to those in Example 1. The thickness of the first magnetic recording layer and the thickness of the second magnetic recording layer were adjusted so that Ku$_1$T$_1$ is $2.9\times 10^{-12}$ erg/cm$^2$ and Ku$_2$T$_2$ is $3.0\times 10^{-12}$ erg/cm$^2$, that is, Ku$_2$T$_2$ is a little larger than Ku$_1$T$_1$.

The measurements of the Hc, TAA, O/W, normalized noises, S/N, D$_{50}$, and decay rate of output signal were made on the perpendicular magnetic recording medium of Comparative Example 2 in the same way as described previously. Table 2 shows the results for Comparative Example 2 in comparison with the results on Example 1.

As is apparent in Table 2, Comparative Example 2 did not enough reduce the Hc and did not obtain sufficient O/W. Although the TAA increased owing to the increase of film thickness, the magnetic recording medium of Comparative Example 2 resulted in much inferior characteristics of normalized noises and the S/N except for the decay rate of output signals.

As described above, despite a layer structure employing the same materials, Comparative Example 2 failed to reduce the Hc and suffered from much degradation in the read-write performances due to only the difference in the $Ku_1T_1$ of the first magnetic recording layer and the $Ku_2T_2$ of the second magnetic recording layer. This result demonstrated that in a case $Hk_1 > Hk_2$, which is the case in Example 1 and Comparative Example 2, the inequality $Ku_1T_1 > Ku_2T_2$ must be satisfied to sufficiently reduce the switching field and to obtain high read-write performances.

TABLE 2

| Item | Example 1 | Comp Ex 2 |
| --- | --- | --- |
| Hc (Oe) | 4,710 | 6,540 |
| TAA [336 kfci] (mVp-p) | 1.82 | 2.09 |
| O/W (dB) | 38.2 | 21.1 |
| normalized noises [336 kfci] (μVrms/mVp-p) | 19.5 | 31.4 |
| S/N [336 kfci] (dB) | 25.5 | 21.4 |
| $D_{50}$ (kfci) | 371 | 350 |
| decay rate of output signals [28 kfci] (%/decade) | 0.67 | 0.15 |

EXAMPLE 2

A perpendicular magnetic recording medium having a structure shown in FIG. 1 was produced with varied materials for the magnetic recording layers and for the coupling layer. Nonmagnetic substrate 1 was a chemically strengthened glass substrate having a smooth surface (N-5 glass substrate manufactured by HOYA Corporation). After cleaning, the substrate was introduced into a sputtering apparatus and amorphous soft magnetic backing layer 2 of CoZrNb having a thickness of 200 nm was deposited using a target of 87 at % Co-5 at % Zr-8 at % Nb. Then, underlayer 3 of NiFeSi having a thickness of 11 nm was deposited using a target of Permalloy, 82 at % Ni-12 at % Fe-6 at % Si. Subsequently, nonmagnetic intermediate layer 4 of ruthenium having a thickness of 10 nm was deposited using a target of ruthenium under argon gas pressure of 4.0 Pa. Subsequently, first magnetic recording layer 5 of CoCrPt—SiO$_2$ having a granular structure and a thickness of 10 nm was deposited using a target of 90 mol % (72 at % Co-10 at % Cr-18 at % Pt)—10 mol % SiO$_2$ under a gas pressure of 5.3 Pa. Then, coupling layer 6 of cobalt having a thickness of 0.3 nm was deposited using a target of cobalt and argon gas containing 10 vol % of N$_2$ gas under a gas pressure of 1 Pa. Subsequently, second magnetic recording layer 7 of CoCrPt having a thickness of 6 nm was deposited using a target of 70 at % Co-20 at % Cr-10 at % Pt. Finally, protective layer 8 of carbon having a thickness of 7 nm was deposited using a target of carbon. Then, the substrate having the laminated layers was taken out from the vacuum chamber. Depositions of the layers other than the nonmagnetic intermediate layer of ruthenium, the first magnetic recording layer of CoCrPt—SiO$_2$, and the coupling layer of cobalt were conducted under an argon gas pressure of 0.67 Pa. The first magnetic recording layer of CoCrPt—SiO$_2$ was formed by an RF magnetron sputtering method, and other layers were formed by a DC magnetron sputtering method. After that, liquid lubricant layer 9 of perfluoropolyether having a thickness of 2 nm was formed by a dipping method. Thus, a perpendicular magnetic recording medium was manufactured.

COMPARATIVE EXAMPLE 3

A perpendicular magnetic recording medium of Comparative Example 3 was manufactured in the same manner as in Example 2 except that coupling layer 6 of cobalt and a second magnetic recording layer 7 of CoCrPt were not deposited. $Ku_1$, $Ku_2$ and other properties of Example 2 were measured in the same way as in Example 1. $Ku_1T_1$ and $Ku_2T_2$ in Example 2 were $5.0 \times 10^{-12}$ erg/cm$^2$ and $1.2 \times 10^{-12}$ erg/cm$^2$, respectively, and the anisotropy magnetic fields $Hk_1$ and $Hk_2$ were 20.0 kOe and 11.1 kOe, respectively. So, the conditions $Hk_1 > Hk_2$ and $Ku_1T_1 > Ku_2T_2$ were satisfied. Measurements of the Hc, O/W, normalized noises, S/N, $D_{50}$, and decay rate of output signal were made on the perpendicular magnetic recording media of Example 2 and Comparative Example 3 in the same way as described previously for Example 1.

Table 3 shows the Hc, the O/W of the signals of 45 kfci overwritten on the signals recorded at 336 kfci, the normalized noises at 336 kfci, S/N, $D_{50}$, and the decay rate of output signals at 28 kfci for the magnetic recording media of Example 2 and Comparative Example 3. As shown in Table 3, Example 2 reduced the Hc by about 1,800 Oe (about 25%) as compared with Comparative Example 3. The exchange coupling energy between magnetic recording layers in Example 2 was 0.22 erg/cm$^2$ and the conditions $Hk_1 > Hk_2$ and $Ku_1T_1 > Ku_2T_2$ were satisfied. This fact contributes to the reduction of the Hc. Owing to the reduction of Hc, Example 2 exhibited excellent O/W of 46.5 dB while Comparative Example 3 exhibited a low value of 16.0 dB. Example 2 showed reduction of noise and improvement of S/N by 1.4 dB as compared with Comparative Example 3. $D_{50}$ also improved by about 13% achieving high recording density. As for the decay rate of output signals, Example 2 exhibited nearly zero, while Comparative Example 3 resulted in a relatively large value of 4.66%/decade. Thus, Example 2 demonstrated significant improvement in thermal stability, too.

As described above, the structure of two magnetic layers that are ferromagnetically coupled according to the invention has demonstrated the simultaneous improvements in the recordability of a magnetic recording medium and the thermal stability. In addition, the improvement in performances of a magnetic recording medium including noise reduction and S/N enhancement has been proven, and the enhancement of recording density in a magnetic recording medium has been achieved.

TABLE 3

| Item | Example 2 | Comp Ex 3 |
| --- | --- | --- |
| Hc (Oe) | 5,214 | 6,990 |
| O/W (dB) | 46.5 | 16.0 |
| normalized noises [336 kfci] (μVrms/mVp-p) | 22.8 | 23.1 |
| S/N [336 kfci] (dB) | 24.3 | 22.9 |
| $D_{50}$ (kfci) | 396 | 349 |
| decay rate of output signals [28 kfci] (%/decade) | 0.01 | 4.66 |

Perpendicular magnetic recording media having a structure shown in FIG. 1 were manufactured with varied materials for the magnetic recording layer and varied thickness of the coupling layer.

EXAMPLE 3

A perpendicular magnetic recording medium having a structure of FIG. 1 was manufactured.

Nonmagnetic substrate 1 was a chemically strengthened glass substrate having a smooth surface (N-5 glass substrate manufactured by HOYA Corporation). After cleaning, the substrate was introduced into a sputtering apparatus and amorphous soft magnetic backing layer 2 of CoZrNb having a thickness of 200 nm was deposited using a target of 87 at % Co-5 at % Zr-8 at % Nb. Then, an underlayer 3 of NiFeSi having a thickness of 11 nm was deposited using a target of a Permalloy, 82 at % Ni-12 at % Fe-6 at % Si. Subsequently, nonmagnetic intermediate layer 4 of ruthenium having a thickness of 10 nm was deposited using a target of ruthenium under argon gas pressure of 4.0 Pa, and then first magnetic recording layer 5 of CoCrPt—SiO$_2$ having a granular structure and a thickness of 9.5 nm was deposited using a target of 90 mol % (72 at % Co-10 at % Cr-18 at % Pt)—10 mol % SiO$_2$ under a gas pressure of 5.3 Pa. Next, coupling layer 6 of ruthenium having a thickness of 1.6 nm was deposited using a target of ruthenium. Subsequently, second magnetic recording layer 7 of CoCrPtB having a thickness of 6.5 nm was deposited using a target of 61 at % Co-22 at % Cr-13 at % Pt-4 at % B. Finally, protective layer 8 of carbon having a thickness of 7 nm was deposited using a target of carbon. Then, the substrate having the laminated layers was taken out from the vacuum chamber. Depositions of the layers other than the nonmagnetic intermediate layer of ruthenium and the first magnetic recording layer of CoCrPt—SiO$_2$ were conducted under an argon gas pressure of 0.67 Pa. The first magnetic recording layer of CoCrPt—SiO2 was formed by an RF magnetron sputtering method, and other layers were formed by a DC magnetron sputtering method. After that, liquid lubricant layer 9 of perfluoropolyether having a thickness of 2 nm was formed by a dipping method. Thus, a perpendicular magnetic recording medium was manufactured.

EXAMPLE 4

A perpendicular magnetic recording medium was manufactured in the same manner as in Example 3 except that coupling layer 6 of ruthenium was deposited to a thickness of 0.25 nm using a target of ruthenium.

EXAMPLE 5

A perpendicular magnetic recording medium was manufactured in the same manner as in Example 3 except that coupling layer 6 of ruthenium having a thickness of 0.25 nm was deposited using a target of ruthenium and subsequently second magnetic recording layer 7 of CoCrPtB having a thickness of 6.5 nm was deposited using a target of 69 at % Co-22 at % Cr-5 at % Pt-4 at % B.

EXAMPLE 6

A perpendicular magnetic recording medium was manufactured in the same manner as in Example 3 except that coupling layer 6 of ruthenium having a thickness of 0.25 nm was deposited using a target of ruthenium and subsequently a second magnetic recording layer of CoCrB having a thickness of 6.5 nm was deposited using a target of 76 at % Co-20 at % Cr-4 at % B.

COMPARATIVE EXAMPLE 4

A perpendicular magnetic recording medium of Comparative Example 4 was manufactured in the same manner as in Example 3 except that neither coupling layer 6 of ruthenium nor a second magnetic recording layer 7 of CoCrPtB was deposited.

The $Ku_1$, $Ku_2$, and other properties of Example 3 through 6 were measured in the same way as in Example 1. In Examples 3 through 6, $Ku_1 T_1$ was $4.8 \times 10^{-12}$ erg/cm$^2$ and $Hk_1$ was 20.0 kOe. The values of $Ku_2 T_2$ were $1.2 \times 10^{-12}$ erg/cm$^2$ in Examples 3 and 4, $9.8 \times 10^{-13}$ erg/cm$^2$ in Example 5, and $8.5 \times 10^{-13}$ erg/cm$^2$ in Example 6. The values of $Hk_2$ were 13.2 kOe in Examples 3 and 4, 10.1 kOe in Example 5, and 8.17 kOe in Example 6. Thus, $Hk_1 > Hk_2$ and $Ku_1 T_1 > Ku_2 T_2$.

The measurements of Hc, O/W, normalized noises, S/N, and decay rate of output signals were made on the perpendicular magnetic recording media of Examples 3 through 6 and Comparative Example 4 as obtained above, and the results were compared. The magnetic recording head used was the one for a recording density of 150 Gb/in$^2$ level. Table 4 shows the Hc, the O/W in which the signal of 64 kfci was overwritten on the signal recorded at 478 kfci, the normalized noise at 478 kfci, the S/N, and the decay rate of output signal at 40 kfci. The material compositions in Table 4 are represented in a simplified form. For example, 90 mol % (72 at % Co-10 at % Cr-18 at % Pt)—10 mol % SiO$_2$ is simplified to $(Co_{72}Cr_{10}Pt_{18})_{90}(SiO_2)_{10}$.

TABLE 4

| | | Example 3 | Example 4 | Example 5 | Example 6 | Comp Ex 4 |
|---|---|---|---|---|---|---|
| first magnetic recording layer | composition | $(Co_{72}Cr_{10}Pt_{18})_{90}(SiO_2)_{10}$ | | | | |
| | thickness (nm) | 9.5 | 9.5 | 9.5 | 9.5 | 9.5 |
| coupling layer | composition | Ru | Ru | Ru | Ru | none |
| | thickness (nm) | 1.6 | 0.25 | 0.25 | 0.25 | none |
| second magnetic recording layer | composition | $Co_{61}Cr_{22}Pt_{13}B_4$ | $Co_{61}Cr_{22}Pt_{13}B_4$ | $Co_{69}Cr_{22}Pt_5B_4$ | $Co_{76}Cr_{20}B_4$ | none |
| | thickness (nm) | 6.5 | 6.5 | 6.5 | 6.5 | none |
| | Hc (Oe) | 5,016 | 5,119 | 4,490 | 4,176 | 6,449 |
| | O/W (dB) | 38.1 | 37.4 | 45.6 | 46.2 | 24.7 |

TABLE 4-continued

|  | Example 3 | Example 4 | Example 5 | Example 6 | Comp Ex 4 |
|---|---|---|---|---|---|
| Normalized noise [478 kfci] ($\mu V_{rms}/mV_{pp}$) | 36.8 | 33.8 | 29.9 | 30.3 | 57.5 |
| S/N [478 kfci] (dB) | 11.98 | 12.64 | 13.59 | 13.62 | 7.24 |
| Decay rate of signals at [40 kfci] (%/decade) | 0.03 | 0.03 | 0.05 | 0.06 | 5.73 |

As is apparent by comparing Comparative Example 4 with Examples 3 through 6, the ferromagnetically-coupled double-layer magnetic layer of the invention decreases Hc, improves O/W, and remarkably reduces the decay rate of signals. In other words, recordability and thermal stability of a medium have been remarkably improved. Performance improvements of a magnetic recording medium such as noise reduction and S/N enhancement have been achieved, contributing to enhancement of recording density.

Next, Example 3 and Example 4 are compared. The measurement resulted in approximately equal value of 0.24 erg/cm² for the exchange coupling energy between magnetic recording layers in the both Examples. Reflecting this result, Hc and O/W are in the same level. As for normalized noise and S/N, however, the medium of Example 4 exhibited lower normalized noise and higher S/N than the medium of Example 3. To study the reason for this fact, the media was studied using a transmission electron microscope. The observation showed that the mean value of the width of grain boundary was 1.2 nm in the magnetic recording layer of Example 3 while 1.5 nm in the medium of Example 4. Further, in the medium of Example 3, the distance between magnetic crystal grains was observed partly decreased to about 0.5 nm or closer. This shows improvement in isolation between magnetic crystal grains in the medium of Example 4 as compared with the medium of Example 3. From the foregoing, it has been demonstrated that the ferromagnetic coupling through a ruthenium coupling layer produces the effects to reduce the switching field and improve read-write performance while maintaining thermal stability. Further performance enhancement has been achieved by reducing thickness of the coupling layer by virtue of improvement in isolation between magnetic crystal grains.

Then, the results of Example 4 were compared with the results in Examples 5 and 6. Comparing between Example 5 and Example 6, the normalized noise and the S/N are nearly equivalent. While comparing Example 4 with Examples 5 and 6, Examples 5 and 6 decreased the normalized noise and improved the S/N by about 1 dB. In Examples 5 and 6, as compared with Example 4, the Hc decreased and the O/W improved. Noise reduction in the second magnetic recording layer possibly contributes to the reduction of normalized noise and the improvement in the O/W. The measurement resulted in the value 0.24 erg/cm² for the exchange coupling energy between magnetic recording layers in Examples 5 and 6. This value is equivalent to the value in Example 4. Comparing the values of $Ku_2T_2$ in the second magnetic recording layer, the values were $1.2 \times 10^{-12}$ erg/cm² in Example 4, $9.8 \times 10^{-13}$ erg/cm² in Example 5, and $8.5 \times 10^{-13}$ erg/cm² in Example 6. That is, the decrease of Hc and the improvement in the O/W in Examples 5 and 6 can be considered to be obtained owing to the reduction of $Ku_2T_2$ in the second magnetic recording layer. As described above, it has been demonstrated that the read-write performance of a medium including the normalized noise and the S/N are improved by controlling the platinum content within 10 at % in a magnetic recording layer exhibiting lower Hk value. In addition, the Hc is also decreased, demonstrating the effect to improve the recordability.

Thus, a perpendicular recording medium has been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

What is claimed is:

1. A perpendicular magnetic recording medium comprising a nonmagnetic substrate, a first magnetic recording layer, a coupling layer disposed directly on the first magnetic recording layer, and a second magnetic recording layer disposed directly on the coupling layer, the first magnetic recording layer and the second magnetic recording layer being ferromagnetically coupled with a coupling energy controlled by the coupling layer to reverse individually magnetizations, and an axis of easy magnetization of the first magnetic recording layer and an axis of easy magnetization of the second magnetic recording layer being approximately perpendicular to a plane of the nonmagnetic substrate,
wherein
$Ku_1T_1 > Ku_2T_2$ when $Hk_1 > Hk_2$, and
$Ku_1T_1 < Ku_2T_2$ when $Hk_1 < Hk_2$,
where $Hk_1$, $Ku_1$, and $T_1$ are an anisotropy magnetic field, a uniaxial anisotropy constant, and a thickness of the first magnetic recording layer, respectively, and $Hk_2$, $Ku_2$, and $T_2$ are an anisotropy magnetic field, a uniaxial anisotropy constant, and a thickness of the second magnetic recording layer, respectively.

2. The perpendicular magnetic recording medium according to claim 1, wherein the coupling layer is substantially composed of an element selected from the group consisting of V, Cr, Fe, Co, Ni, Cu, Nb, Mo, Ru, Rh, Ta, W, Re, and Ir, or an alloy principally composed of at least one element selected from the group.

3. The perpendicular magnetic recording medium according to claim 1, wherein the coupling layer has a thickness of at most 2 nm.

4. The perpendicular magnetic recording medium according to claim 1, wherein the coupling layer has a thickness of at most 0.3 nm.

5. The perpendicular magnetic recording medium according to claim 1, wherein at least one of the first magnetic recording layer and the second magnetic recording layer has a granular structure that is composed of a matrix of a nonmagnetic oxide or a nonmagnetic nitride and magnetic crystal grains dispersed in the matrix.

6. The perpendicular magnetic recording medium according to claim 1, wherein one of the first magnetic recording layer and the second magnetic recording layer has a lower anisotropy magnetic field Hk, and the magnetic recording layer that exhibits the lower anisotropy magnetic field Hk contains cobalt and chromium, and a content of platinum in a range of zero to 10 at %.

7. The perpendicular magnetic recording medium according to claim 1, wherein one of the first magnetic recording layer and the second magnetic recording layer has a lower anisotropy magnetic field Hk, and the magnetic recording layer that exhibits the lower anisotropy magnetic field Hk further contains an element selected from a group consisting of Ta, B, Nb, and N.

8. The perpendicular magnetic recording medium according to claim 1, wherein an exchange coupling energy between the first magnetic recording layer and the second magnetic recording layer is at least $5 \times 10^{-3}$ erg/cm$^2$.

9. The perpendicular magnetic recording medium according to claim 8, wherein at least one of the first magnetic recording layer and the second magnetic recording layer has a granular structure that is composed of a matrix of a non-magnetic oxide or a nonmagnetic nitride and magnetic crystal grains dispersed in the matrix.

10. The perpendicular magnetic recording medium according to claim 8, wherein one of the first magnetic recording layer and the second magnetic recording layer has a lower anisotropy magnetic field Hk, and the magnetic recording layer that exhibits the lower anisotropy magnetic field Hk contains cobalt and chromium, and a content of platinum in a range of zero to 10 at %.

11. The perpendicular magnetic recording medium according to claim 8, wherein one of the first magnetic recording layer and the second magnetic recording layer has a lower anisotropy magnetic field Hk, and the magnetic recording layer that exhibits the lower anisotropy magnetic field Hk further contains an element selected from a group consisting of Ta, B, Nb, and N.

12. The perpendicular magnetic recording medium according to claim 8, wherein the coupling layer has a thickness of at most 2 nm.

13. The perpendicular magnetic recording medium according to claim 12, wherein one of the first magnetic recording layer and the second magnetic recording layer has a lower anisotropy magnetic field Hk, and the magnetic recording layer that exhibits the lower anisotropy magnetic field Hk contains cobalt and chromium, and a content of platinum in a range of zero to 10 at %.

14. The perpendicular magnetic recording medium according to claim 12, wherein one of the first magnetic recording layer and the second magnetic recording layer has a lower anisotropy magnetic field Hk, and the magnetic recording layer that exhibits the lower anisotropy magnetic field Hk further contains an element selected from a group consisting of Ta, B, Nb, and N.

15. The perpendicular magnetic recording medium according to claim 12, wherein at least one of the first magnetic recording layer and the second magnetic recording layer has a granular structure that is composed of a matrix of a non-magnetic oxide or a nonmagnetic nitride and magnetic crystal grains dispersed in the matrix.

16. The perpendicular magnetic recording medium according to claim 8, wherein the coupling layer has a thickness of at most 0.3 nm.

17. The perpendicular magnetic recording medium according to claim 16, wherein one of the first magnetic recording layer and the second magnetic recording layer has a lower anisotropy magnetic field Hk, and the magnetic recording layer that exhibits the lower anisotropy magnetic field Hk contains cobalt and chromium, and a content of platinum in a range of zero to 10 at %.

18. The perpendicular magnetic recording medium according to claim 16, wherein one of the first magnetic recording layer and the second magnetic recording layer has a lower anisotropy magnetic field Hk, and the magnetic recording layer that exhibits the lower anisotropy magnetic field Hk further contains an element selected from a group consisting of Ta, B, Nb, and N.

19. The perpendicular magnetic recording medium according to claim 16, wherein at least one of the first magnetic recording layer and the second magnetic recording layer has a granular structure that is composed of a matrix of a non-magnetic oxide or a nonmagnetic nitride and magnetic crystal grains dispersed in the matrix.

* * * * *